Oct. 5, 1954 M. ROSENBERG ET AL 2,691,155
MEMORY SYSTEM
Filed April 1, 1953 6 Sheets-Sheet 1

INVENTOR.
RAYMOND STUART-WILLIAMS &
MILTON ROSENBERG

BY Samuel Lindenberg
ATTORNEY

Oct. 5, 1954 M. ROSENBERG ET AL 2,691,155

MEMORY SYSTEM

Filed April 1, 1953 6 Sheets-Sheet 2

INVENTOR.
RAYMOND STUART-WILLIAMS
& MILTON ROSENBERG

BY Samuel Lindenberg
ATTORNEY

INVENTOR.
RAYMOND STUART-WILLIAMS
& MILTON ROSENBERG

BY Samuel Lindenberg
ATTORNEY

INVENTOR.
RAYMOND STUART-WILLIAMS
& MILTON ROSENBERG
BY Samuel Lindenberg
ATTORNEY Oct. 5, 1954 M. ROSENBERG ET AL 2,691,155

MEMORY SYSTEM

Filed April 1, 1953 6 Sheets-Sheet 5

INVENTOR.
RAYMOND STUART-WILLIAMS
& MILTON ROSENBERG
BY Samuel Lindenberg
ATTORNEY Oct. 5, 1954 M. ROSENBERG ET AL 2,691,155

MEMORY SYSTEM

Filed April 1, 1953 6 Sheets-Sheet 6

INVENTOR.
RAYMOND STUART-WILLIAMS
& MILTON ROSENBERG

BY Samuel Lindenberg
ATTORNEY

Patented Oct. 5, 1954 2,691,155

UNITED STATES PATENT OFFICE 2,691,155

MEMORY SYSTEM

Milton Rosenberg, Trenton, and Raymond Stuart-Williams, Princeton, N. J., assignors to Radio Corporation of America, a corporation of Delaware Application April 1, 1953, Serial No. 346,162

19 Claims. (Cl. 340—174)

This invention relates to magnetic switching matrices such as are used, for example, in controlling the writing of information into and the reading of information out of memory matrices.

In articles appearing in "RCA Review" of June 1952 (pages 183–201), I. R. E. Proceedings of April 1952 (pages 475–478) and "Journal of Applied Physics" of January 1951 (pages 44–48), are described magnetic matrices employing an array of cores of magnet material preferably having a high coercive force and a substantially rectangular hysteresis loop. With all cores initially magnetically saturated in the same direction (N), a selected core is "turned over" by application of magneto-motive forces sufficient to drive it to magnetic saturation in the reverse direction (P), in which state it remains because of its remanence until there is applied a restoring pulse of amplitude sufficient to drive it back to the original (N) direction of saturation. The array of magnetic cores is described in these articles as a memory device able to store binary coded information as a P or N saturation condition of the cores. It will be appreciated that if a different coil is coupled to each core in a matrix, as a core in the matrix is driven from one saturation polarity to the other a voltage is induced in the coil. This voltage may be applied to any utilization devices. The matrix thus can be used for random switching operations including that of driving a magnetic matrix memory. A system wherein two magnetic matrix switches of this type are used to control a magnetic matrix memory may be found described and claimed in an application Ser. No. 264,217, by Jan A. Rajchman, filed December 29, 1951, and assigned to this assignee.

In an application filed on February 20, 1953, for "Magnetic Switching Devices," by Jan A. Rajchman, bearing Serial No. 337,902 and assigned to this assignee, there is described an improved switch wherein the switch cores are continuously biased in one direction (N) of saturation by a direct-current coil and a change in flux of a selected core is effected by coincident application of pulses to switching windings of that core, the core, upon termination of the switching pulses, being returned by the D. C. bias to its original state of saturation. These improved switches do not require a winding to restore them to their starting condition; they do not require, for operation, core materials having a high coercive force and a rectangular hysteresis loop, and it is not necessary to saturate the core material in the P-direction, thus permitting efficient operation of the switch as a current transformer.

In accordance with this invention, two or more switches of this improved type are utilized to control a magnetic memory matrix in the manner described in the above indicated RCA Review article and application, and pulses which control these switches may be terminated either concurrently or in succession, selectively to determine whether a selected core of the memory matrix is left in a desired state of N-saturation or in a desired state of P-saturation.

Further, in accordance with this invention, the pulses for operation of the switches are produced in a program control network including a master pulse former which gates all common drivers of the switches and a second pulse former which provides an inhibiting or driving pulse for the drivers of one of the switches and which may be applied or withheld, depending upon the information to be stored or restored in the memory matrix. A significant feature is that the P or N nature of the information in the selected memory core is available before the master pulse terminates and hence such information may be read out of and restored into the selected memory core within the program cycle and by utilization of the switching pulses.

Further, in accordance with the invention as applied to parallel-operated memory matrices, the master pulse may be applied to a switch common to one side of all memory matrices and to switches individual to the other side of each of the matrices. The output of the second pulse former may be applied or withheld from each of the latter switches depending upon the information to be stored or restored in the associated memory matrix.

The invention further resides in features of construction, combination and arrangement hereinafter described and claimed.

For a more complete understanding of the invention and for illustration of various embodiments thereof, reference is made to the accompanying drawings in which:

Figure 1 schematically illustrates an element of a magnetic switching matrix shown to assist in explanation of the present invention;

Figure 1:
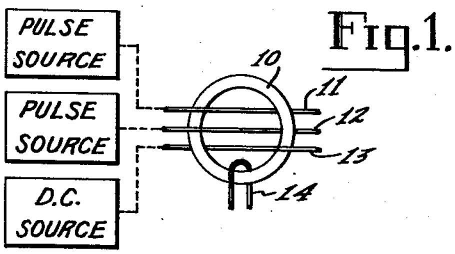
Figure 5:
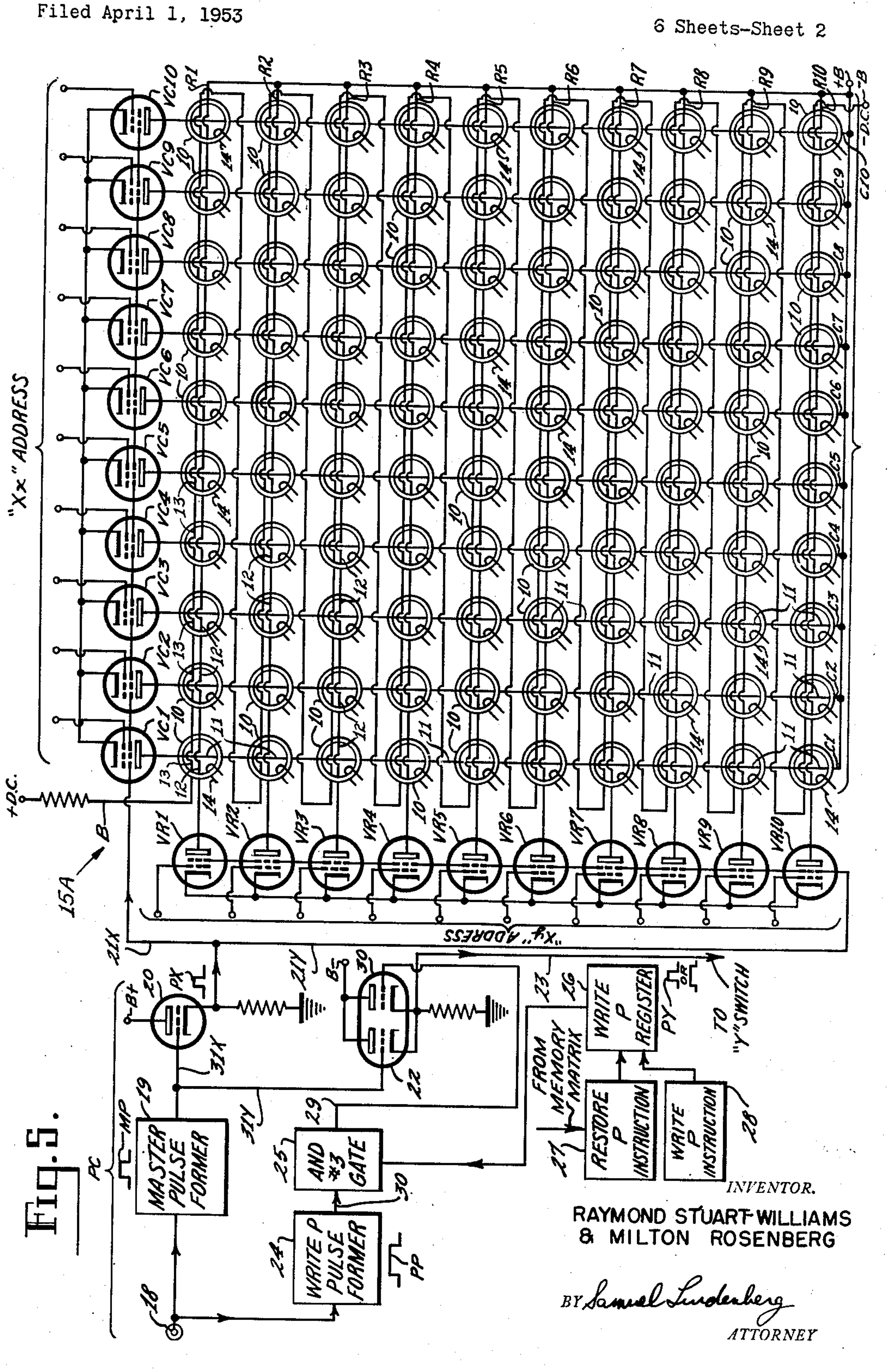
Figure 5A:
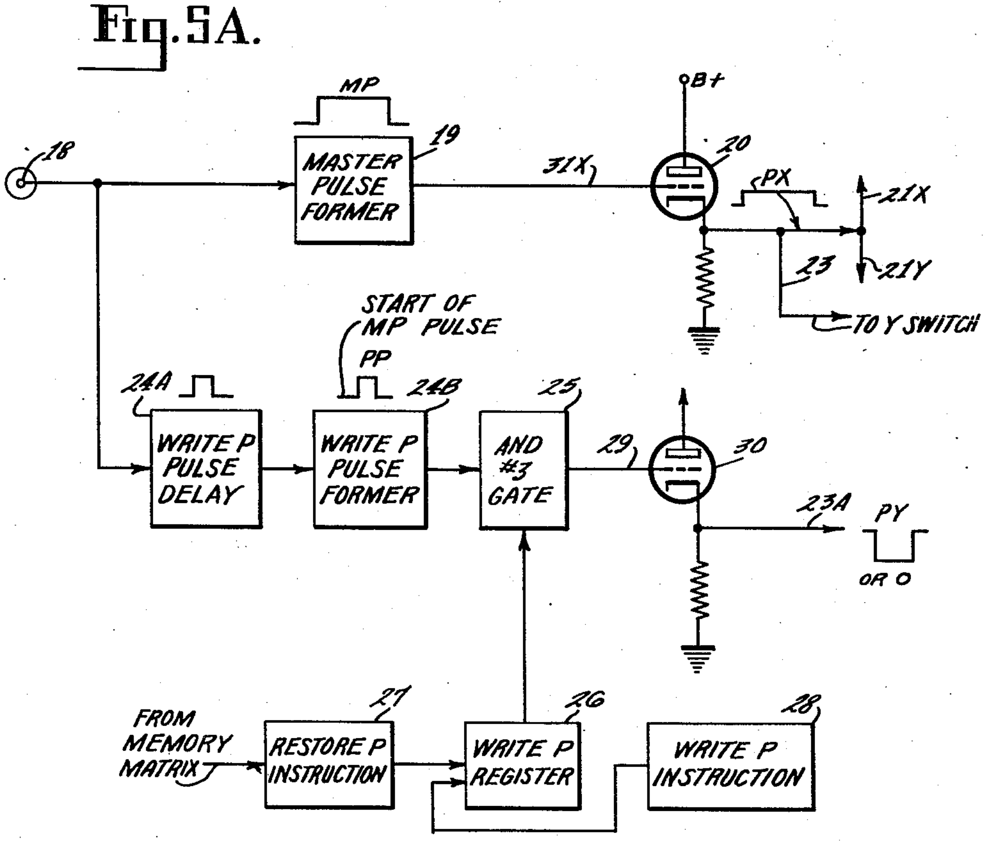
Figure 5B:
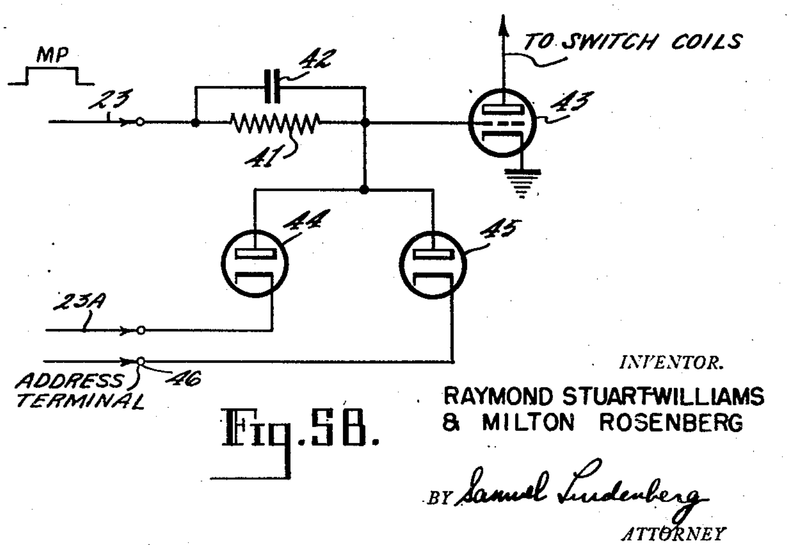
Figure 6:
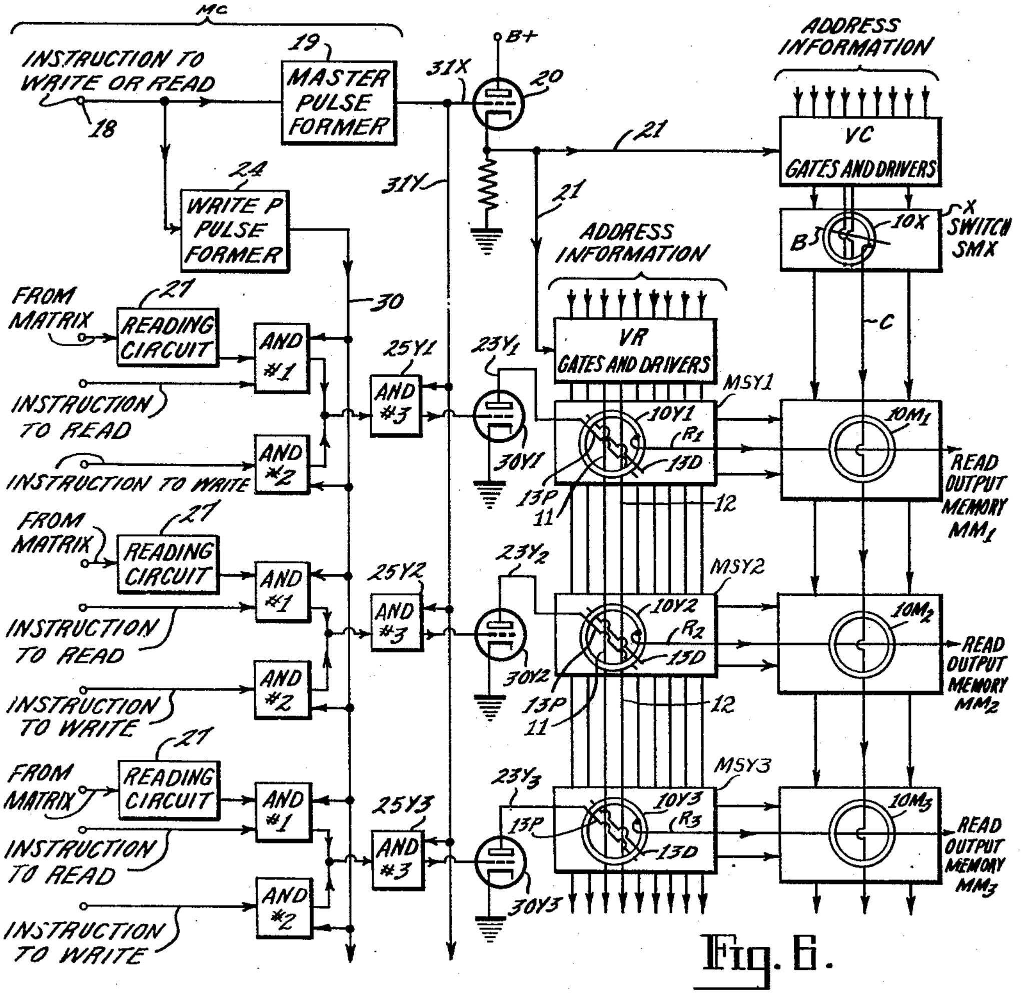
Figure 7A:
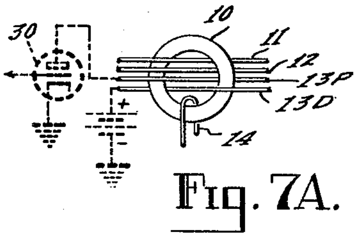
Figure 7B:
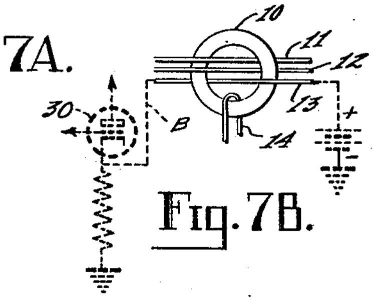
Figure 7C:
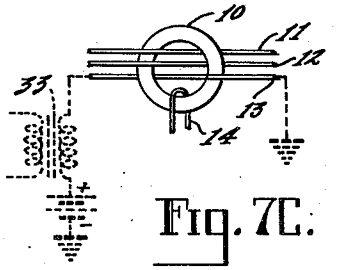
Figure 8:
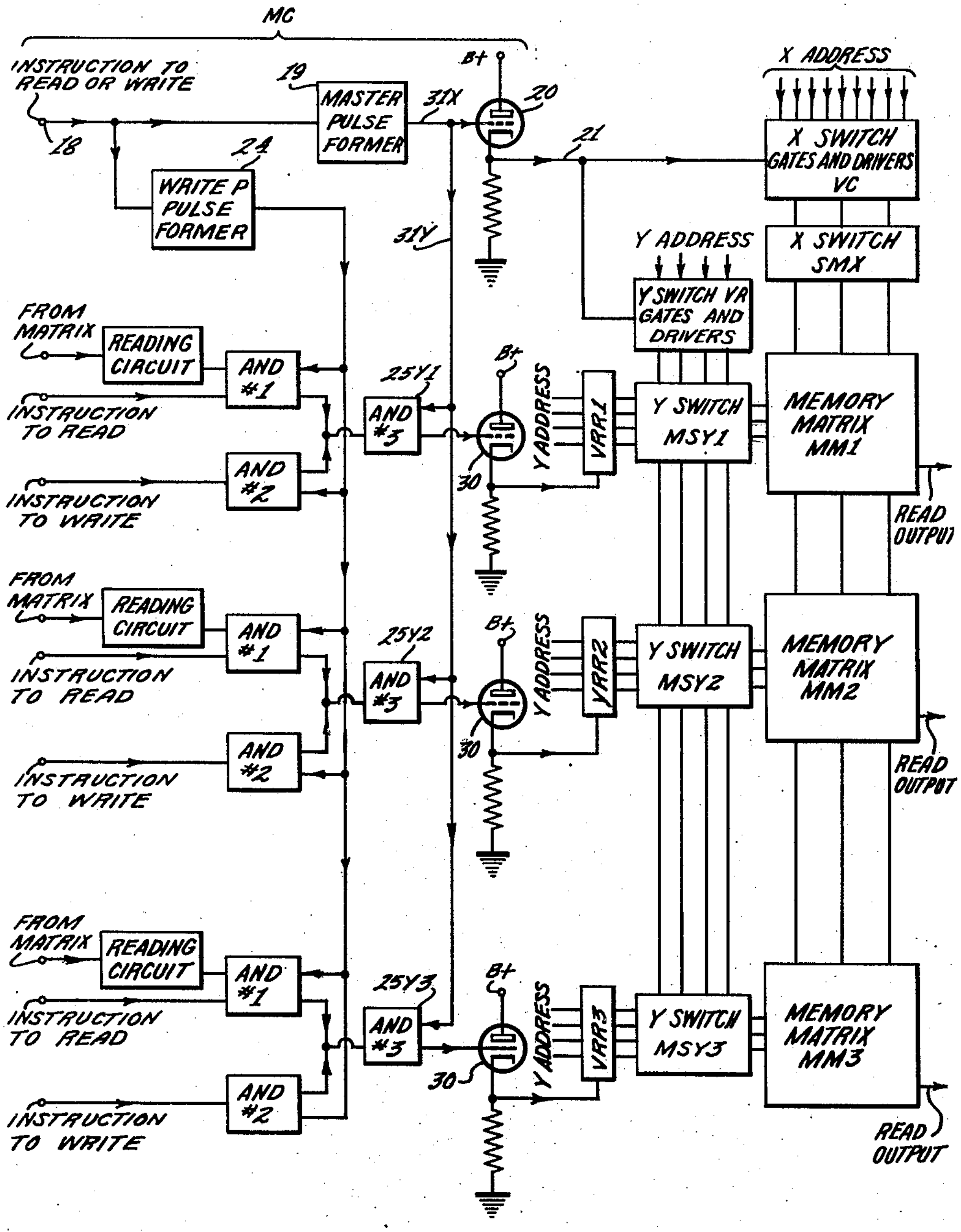
Figure 9:
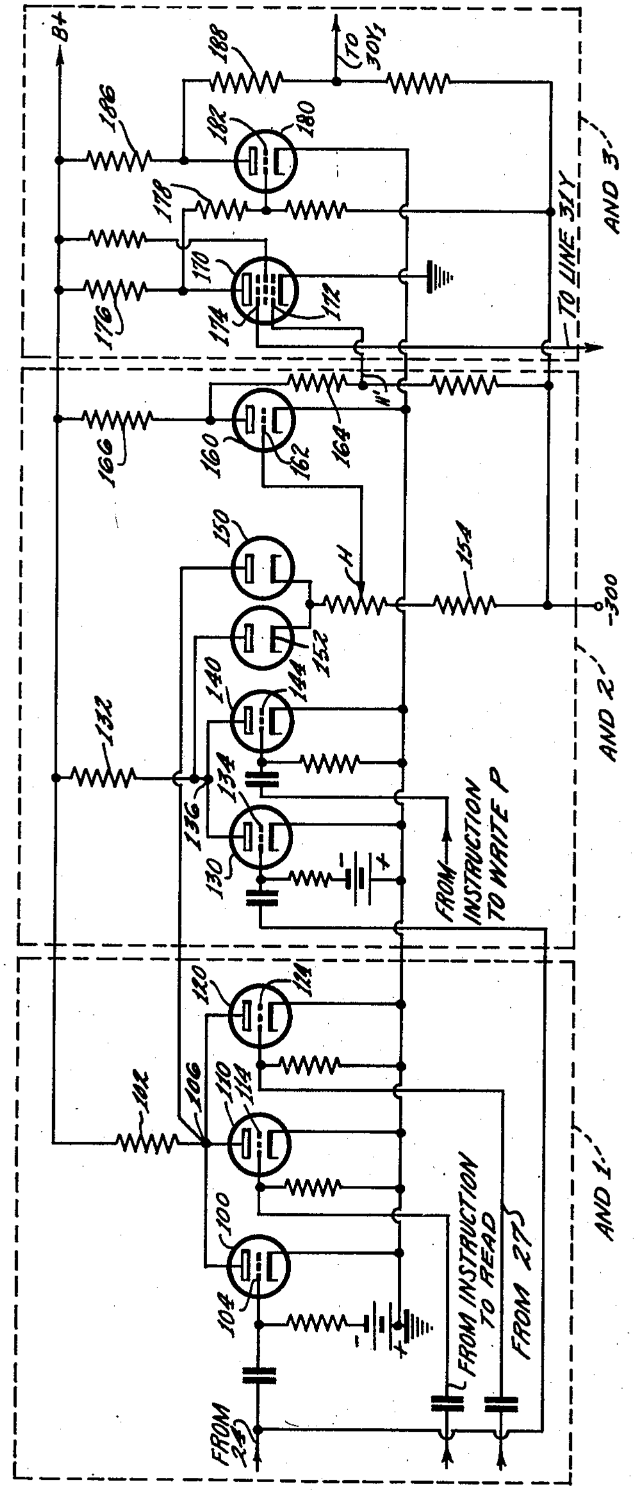

Figure 5 schematically illustrates a switching matrix embodying the switching elements of Figure 1 and a program control network which is an embodiment of the invention;

Figure 5A is a schematic illustration of a switch program control network which is an alternative to the one shown in Figure 5;

Figure 5B illustrates a gate and driver circuit suitable for use in driving the magnetic switch cores responsive to address;

Figure 6 schematically illustrates a parallel memory matrix system controlled by programmed switches embodying the present invention;

Figures 7A, 7B and 7C illustrate modifications of Figure 1;

Figure 8 schematically illustrates another parallel memory matrix arrangement controlled by programmed switches embodying the present invention; and Figure 9 represents circuit diagrams of gates which are employed in the embodiment of the invention.

Figure 2:
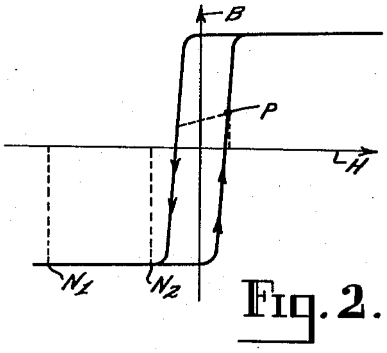
Figure 2 is an explanatory figure referred to in discussion of Figure 1.

The simplest possible switch element E which is utilized in the switching matrices later described is shown in Figure 1. The core 10 is preferably toroidal in form and is made of magnetic material which may have a hysteresis characteristic such as is shown in Figure 2. In this simple form of magnetic switch element, the switching coils or conductors 11 and 12 are wound in the same direction or suitably poled so that they are cumulative in their effect upon the core. The winding 13 is oppositely poled or wound and is continuously energized by direct current. The direct current traversing winding 13 is of such magnitude that it biases the core material to a point N1 on its B/H curve (Figure 2).

Figure 4A:
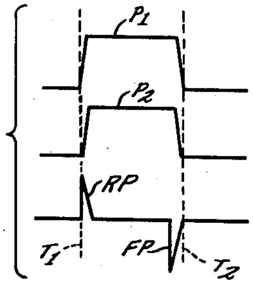
Figures 4A, 4B and 4C are explanatory wave shape figures referred to in discussion of Figures 1, 3 and other figures.
Figure 4C:
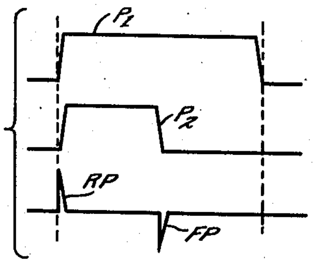
Figure 4B:
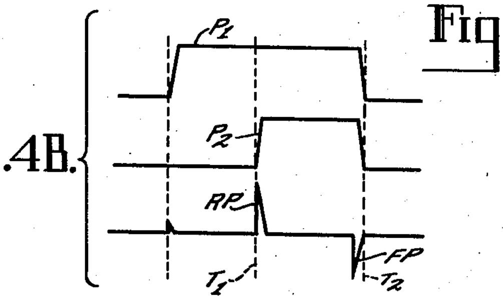

In brief, the core 10 is continuously biased by the direct-current in winding 13 to a point of N-saturation well beyond the lower knee of the hysteresis loop. If a current pulse, such as pulse P1 or P2 (Figures 4A, 4B, 4C) is applied to only one of the windings 11, 12, the core material shifts from point N1 to N2 at the beginning of the pulse and back from point N2 to point N1 at the termination of the pulse. In other words, if only one of the windings 11, 12 is energized by a pulse, the core is maintained in a state of N-saturation by the direct current of biasing winding 13 and consequently there is substantially no change of flux and no voltage induced in output coil 14 of the core.

If, however, a pair of pulses is respectively applied to windings 11, 12 and if they are coincident (Figures 4A, 4B, 4C) for a time not less than its turn-over time, the core material shifts to point P (Figure 2) of the hysteresis loop along the path indicated by the ascending arrows at the time T1 (Figures 4A, 4B, 4C) corresponding with beginning of the coincidence. The large change in flux occurring upon such shift of the core material to point P causes an output pulse RP (Figures 4A, 4B, 4C) to appear in the output winding 14. At time T2, corresponding with termination of the coincidence, the core material, because of biasing current in winding 13, moves from P to the region of N saturation along the path indicated by the descending arrows (Figure 2) and a second output pulse FP (Figures 4A, 4B, 4C) of opposite polarity appears across the terminals of the output coil 14.

With a magnetic switch element of this improved type, no pulsed N restore winding is used, the core returning to its N state, if switched, within the switching pulse interval rather than in a subsequent restore interval as heretofore. Furthermore, as the core material is positively retained both in N state of saturation and at point P by current in the core windings, it is not necessary, as heretofore, to employ a core material having high remanence or retentivity. It is thus possible to employ materials having very low coercive force which are cheaper and presently available in quantity. It is further to be noted, and as indicated in Figure 2, that it is not necessary to swing the core material over its complete characteristic to saturation in the P-direction and consequently efficient operation of the switching element as a current transformer is obtainable.

Figure 3:
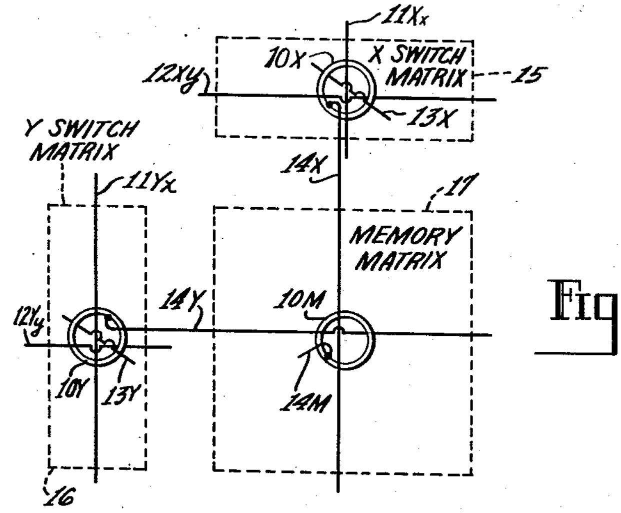
Figure 3 is a simplified block diagram of a switching arrangement for a memory matrix.

Referring to Figure 3, each of the rectangles 15 and 16 represents a switching matrix comprising a plurality of switching elements of the type shown in Figure 1. All of the biasing windings of the cores in each switching matrix are connected together as a common winding for energization from a suitable source of direct current, not shown. The cores of each matrix, as more fully shown in Figure 5, may be arranged in columns and rows with the switching windings 11 of all cores in each column interconnected, as in series, to provide a separate "X" input coil and with the switching windings 12 of the cores in each row interconnected, as in series, to form a separate "Y" input coil. For clarity of illustration, there is shown in Figure 3 only the selected cores 10X, 10Y of the switching matrices 15 and 16. Upon coincidence of a pair of pulses applied to the selected coils (11X$x$, 12X$y$) of switch matrix 15, the so selected core 10X of switch 15 is driven from the N1—N2 region to point P (Figure 2) in opposition to the biasing effect of the D. C. winding 13X, all as above explained in discussion of Figures 1 and 4A–4C. Similarly, coincidence of a pair of pulses to the selected input coils (11Y$x$, 12Y$y$) of switch matrix 16 drives the selected core 10Y of switch 16 from point N1 to point P.

The output windings 14X, 14Y of the selected switch cores 10X, 10Y are both inductively coupled to a selected core 10M of a magnetic memory matrix 17 which may be of any of the types disclosed in the aforesaid articles or application. These memory cores store binary digital information as saturation at P or N, thus the material of the memory cores such as M require qualities such as high remanence and a substantially rectangular hysteresis loop. Assuming the pulses applied to the swtiches 15 and 16 are so timed that the output pulses RP of the selected cores are coincident, the summation of the outputs, corresponding with shift of each of the cores 10X, 10Y from point N1 to point P of its hysteresis loop, is sufficient to shift the memory core 10M from a state of N-saturation to a point of P-saturation.

If the termination of the switching pulses is so timed that the output pulses FP of the selected switch cores are coincident, the combined output of the excited coils 14X, 14Y of the selected switching cores 10X, 10Y is sufficient to drive the core 10M of the memory matrix from P-saturation to N-saturation. If, however, the pulses to the switches 15 and 16 are not so terminated, none of the non-coincident outputs of the coils 14X, 14Y of the switching cores 10X, 10Y is sufficient to turn over the memory core 10M which therefore remains in a state of P-saturation.

Consequently, by applying a pair of switching pulses to a selected pair of inputs of switch 15, and by concurrently applying a pair of switching pulses to a selected pair of inputs of switch 16, there is selected a particular core of the memory matrix 17, and then by terminating the switching pulses either concurrently or in succession it is possible to determine whether the selected core 10M of the memory matrix is left in a state of P-saturation or in a state of N-saturation. Thus, a mechanism is provided which permits writing into the memory matrix a desired bit of information.

In an application filed on March 8, 1952, for "Magnetic Matrix and Computing Devices," by J. A. Rajchman, bearing Serial Number 275,622 and assigned to this assignee, there is described and claimed apparatus wherein two magnetic switches drive a magnetic memory, but there, the writing operation requires two intervals. The first interval is the one in which the switch cores are selected and driven to P. The driving currents in the switches are then allowed to subside. The second interval is the one wherein the selected cores in the switches are either simultaneously or separately returned to N. In the present invention no second interval as a separate entity is required.

In Figure 5, there is shown a 10 by 10 switch 15A giving 100 outputs suited to operate one side, for example the X side, of a 10,000 bit memory matrix. A similar switch matrix, not shown, operates the Y side of the memory matrix generally as in Figure 3. Specifically, any of the 10X*x* addresses of the switch 15A may be combined with any of its 10X*y* addresses to select, in accordance with the X address of a bit of information, that one of its 100 switch cores which is to be shifted from point N1 to point P of its magnetization curve. Either the X address or the Y address, or both, of a particular bit of information may be set prior to a cycle of the control or switching pulses.

The program control network PC which supplies the paired pulses to the switch matrices is shown in the left side of Figure 5. When a bit of information is to be written into the memory matrix, the instruction "to write" is in the form of a pulse applied from a source (not shown) through line 18 to the master pulse former 19 whose output may be represented by a short pulse MP. The pulse former 19 may be a one-shot multivibrator, followed by a shaping stage, or other well-known circuitry for producing a substantially rectangular pulse. For example, suitable types of circuits are found described on page 166 et seq. as a "monostable multivibrator" in "Waveforms," by Chance et al., published by McGraw-Hill Co. The master pulse may be applied to the grids of the cathode follower tubes 20 and 22 or equivalent by lines 31X, 31Y. The output of tube 20 is applied through lines 21*x*, 21*y* to the "X" switch 15A: specifically, the master pulse output of tube 20 is applied to the combined driver and gate tubes VC1–VC10 for the column input coils C1–C10 of switch 15A and to the combined driver and gate tubes VR1–VR10 for the row input coils R1–R10 of switch 15A to enable the column tube and row tube which have an address signal applied to conduct. The output pulse of control tube 22 is concurrently applied by line 23 to the combined driver and gate tubes of the Y switch (not shown but similar to X switch 15A) to enable the addressed ones of these tubes to conduct.

As the Y switch is similar to the X switch 15A, it is only necessary specifically to disclose and describe the X switch. Each of the column coils C1–C10 of switch 15A includes the serially-connected windings 11 on all the cores in that column and each of the row coils R1–R10 includes the serially-connected windings 12 on all of the cores of that row. The direct-current B winding common to all cores of switch 15A includes the coils or conductors 13 of all of the cores. In brief, each element of switch 15A is similar to the element shown in Figure 1 with its coil 11 in a particular column, with its coil 12 in a particular row and with its coil 13 continuously energized by direct current. Thus, when the address primed row and column tubes of switch 15A are made to conduct by the master pulse, a particular core of the switch 15A is selected in accordance with the X address of the information, which has previously been applied as a signal to the control grid of a particular one of the column tubes VC1–VC10 and a particular one of the row tubes VR1–VR10. This will move the magnetic position of the switch core coupled to the two coils excited by application of a signal to their associated row and column tubes from the point N1 to point P, Figure 2, as above described. Because of the change in flux of the selected core of switch 15A, a P-driving impulse RP will appear across the output coil 14 of the selected core of X switch 15A and serves, as noted in Figure 3, as a driving pulse for the corresponding column coil of a memory matrix. At the same instant, due to application of the output of tube 22 by line 23 to the Y switch, a P driving impulse from the selected core of that switch is supplied to the corresponding row coil of the memory matrix. Thus, one core of the memory matrix is subjected to both output pulses RP of the switching matrices and it alone is driven to P-saturation. Whether the so selected core of the memory matrix remains in the P state or is returned to the N state before the next program cycle is determined by coincidence or non-coincidence of termination of the pulses respectively applied to the switching matrices, generally as above explained in discussion of Figure 3 and as will now be further and more specifically explained in connection with the program control of Figure 5.

The "to-write" instruction pulse is applied not only to the master pulse former 19 but also to the "write P" pulse former which provides an output pulse PP which continues after the master pulse MP terminates. The pulse former 24 may be the same type of circuit as pulse former 19, with component values altered to provide the longer output pulse, or it may be a delay line or a pulse stretcher. The "write P" pulse PP can pass to the control grid of tube 30 by means of an "and" gate 25. The plate and cathode of tube 30 are in parallel with those of tube 22. The "and" gate 25 is merely a coincidence-switch of the type requiring two coincident inputs to provide one output. A suitable "and" gate circuit may be found described and shown on page 378 of a book entitled "Waveforms" by Chance et al. and published by the McGraw-Hill Book Company, Inc., in 1949.

If the "and" gate 25 remains closed during a program cycle, the pulse PP is not applied to tube 30 and the pulses PX, PY, respectively applied to the X switch matrix 15A and the Y switch matrix (not shown) terminate at the same instant. Consequently, the selected cores of both switching matrices simultaneously shift back to N-saturation due to the biasing current in their coils B (windings 13 in series) to produce coincident output pulses FP for the selected core of the memory matrix. As above explained in discussion of Figure 3, these coincident pulses drive the selected memory core from P-saturation to N-saturation. Thus, if the gate 25 is not opened during the program cycle, the bit of information retained by the selected memory core is N.

If, on the other hand, it is desired that the bit of information to be retained in the selected memory core is P, then the gate 25 is opened during the program cycle. In such case, the pulse PP is transmitted to tube 30 and the pulse PY transmitted to the Y switch does not terminate until after termination of the pulse PX for the switch. In such case, the output pulses FP of the two switching matrices are not coincident and, since they individually are incapable of driving the memory core from P to N, the memory core remains in the P-state.

It is to be noted that the switch matrices do not require application of any N restoring pulse, the selected core of the switch being returned to N1 by a direct-current bias in the common bias winding upon termination of the control pulse PX or PY, as the case may be. It is also to be noted that before termination of the shorter pulse MP, it has been determined whether the information to be retained by the selected memory core is N or P. Accordingly, when a reading operation occurs a memory core will or will not provide an output indicative of its condition on the front edge of pulses PX and PY so that before termination of pulse MP the stored information can be read out and the pulse PP used, if necessary, to restore that information in the selected memory core.

Whether the "and" gate 25 is opened or closed during a program cycle is controlled from the "write P" register 26 which may also be a one-shot multivibrator and which receives a "restore P" instruction or a "write P" instruction in the form of a tripping pulse from either of the sources 27, 28. If it is desired to "write P," then a pulse from the "write P" instruction source 28 is applied to the register 26. The register primes the "and" gate 25 so that pulse PP may be passed through. It will be recalled that the reading of the information stored in a core in a magnetic memory is performed by driving that core in a direction N. If a voltage is induced in the reading winding of the memory coupled to that core then it is known that the core was in condition P. The core must be restored to P or else the act of reading has erased the information. This restoration is effectuated here by applying the voltage pulse detected in the reading winding to the "restore P" instruction 27 (amplifying and shaping stages) which applies the tripping pulse to the "write P" register to hold open the "and" gate 25.

The short pulse MP need be only of slightly longer duration than the natural turnover time of the memory core material. This single pulse prevents the drives to point P of the selected cores of both switch matrices and upon its termination cores are permitted to concurrently return to point N1 by action of the biasing current, when N is to be written into the memory core. This greatly simplifies timing problems since the longer pulse PP need not have accurately timed edges. Its only function is to obtain non-coincidence of the output pulses of the switching matrices when P is to be written into the memory core. The only requirement for pulse PP is that it should terminate at least one natural turnover time of the memory core material after the termination of pulse MP. Thus, in the complete program control network PC (Figure 5), the only element requiring accurate timing and shaping is the master pulse former 19. This circumstance allows great flexibility of control because control of the magnitude of the master pulse MP together with that of pulse PP may be employed to control the output of all current amplifiers of both switching matrices and because the edges of master pulse MP may be shaped in any desired manner to compensate for non-linearity of such amplifiers and for other effects which tend to make the N and P output pulses of the switches differ in shape.

The circuits represented by block diagrams and generally described herein are well known in the prior art and have many suitable alternative forms. Suitable multivibrator circuits, wave shaping circuits, delay circuits and gate circuits are all described at length in "Waveforms" by Chance and others in the Radiation Laboratory Series, volume 19, published by the McGraw-Hill Publishing Company. The one-shot multivibrators are described on page 166 et seq. and are described as monostable multivibrators. Other suitable "and" gate circuitry, otherwise known as switch or multicoincidence circuits, are described on page 377 et. seq. of the same book.

It is not necessary that the master pulse be the shorter one of the pair. The portion PC of Figure 5 may be replaced with the system shown in Figure 5A. The master pulse former 19 here produces in response to a pulse applied to terminal 18 a pulse MP which has a duration of at least two natural turn over times of the magnetic core storage material. The power amplifier 20 distributes this pulse to all the X and Y amplifiers VC1–VC10, VR1–VR10. At the time that pulse MP commences a delay circuit 24A is operated. This circuit may be a monostable multivibrator, delay line or any circuit capable of producing a delay of the order of one natural turnover time of the storage material. At the end of this delay time the "write P" pulse former 24B is operated. The pulse (PP) should start about half way through MP and should terminate a little after MP has terminated. If it is desired to "write P" this pulse is allowed to pass through "and" gate 3 (25) and then via line 29 to the power amplifier (30). If it is desired to "write P" this amplifier produces a negative going pulse PY which is fed to all Y amplifiers on line 23A.

A typical gate and amplifier used to drive a row or column coil in the Y switch is shown in Figure 5B. The master pulse MP is applied by means of line 23 to the grid of tube 43 via a resistor 41 and condenser 42 in parallel. The function of the condenser is to carry the fast leading and trailing edges of pulse MP. The grid of tube 43 will rise when MP is applied and hence cause current to flow in the switch coils, provided that neither diode 44 nor diode 45 is conducting. Diode 45 is employed as the address switching element. In each operation of the Y switch all terminals 46 are held negative, except for the two selected tubes associated with the desired cores which are made positive. Line 23A is always positive during the first half of MP and hence if terminal 46 is positive tube 43 will conduct. If it is desired to "write P" line 23A goes negative during the last half of MP and hence tube 43 ceases to conduct due to the signal to the grid being shunted by diode 44. Thus by terminating the action of the Y amplifiers early a P is stored in the matrix.

This system is preferable to the system first described as in this case control of MP only controls all amplifiers. The amplifier shown in Figure 5B may also be used for the driving amplifiers for the X switch if desired. In that case, however, line 23A and terminal 46 may be omitted.

In serial operation of information-handling systems, a single binary digit is operated upon in each cycle, whereas in parallel-operation a complete "word" consisting of many binary digits, each in its own separate channel, is operated upon in a cycle. For further discussion of series-operation and parallel-operation, reference is made to pages 266–267 of "High Speed Computing Devices" by the Staff of Engineering Research, Inc., published in 1950 by McGraw-Hill.

In serial-operation, every binary digit has a separate address whereas in parallel-operation every word has an address. Magnetic memory matrices are particularly suited to parallel operation, the storage or memory unit consisting of as many matrices as there are binary digits in the word. The same position is selected in every matrix and the reading windings provide the parallel output.

In order to write into a parallel memory matrix of this type, it is necessary to select the same core position in all memory matrices and to control the operation in each matrix so that the appropriate digit to be recorded is inserted. When a parallel storage matrix is read the output from each reading circuit is employed to control the action of the drivers to restore the information erased by the "read-out." Heretofore this was accomplished by employing two switches (one for the columns and one for the rows of the memory matrix) and by driving the selected row coils and column coils of all the individual memory matrices in parallel. These switches were therefore used to select the desired memory cores in each of the parallel memory matrices. Then, inhibiting windings, individual to each memory matrix were excited or not excited to follow out the "write-N" or "write-P" instruction for the individual memory matrices. This system, shown in the aforesaid "Journal of Applied Physics" article, has the disadvantage that it is difficult to propagate the inhibiting action sufficiently rapidly. Such difficulty may be minimized, as now described, by utilizing a long-short pulse system, such as generally above described, to effect parallel-operation of the memory matrices. Two systems for operating a parallel memory matrix which utilize long-short pulse control are shown in Figures 6 and 8. Both utilize a master control network MC generally similar to network PC of Figure 5. In such program control network, a master pulse is generated to energize all common elements of the system. A second separate control pulse, individual to each memory matrix channel, and starting at the same time as the master pulse, is made shorter than the master pulse if (a) The instruction is given to read and the reading amplifier detects a P state;
(b) The instruction is given to write P.

In both cases, as in the network PC of Figure 5, the length of the second control pulse is determined by a "write P" pulse former 24. The duration of the master pulse need be only slightly greater than twice the time required for the memory cores to change their magnetic state, and the duration of the control pulse need be only about half that of the master pulse. The switch SMX of Figures 6 and 8 need not be, but is preferably, of the type shown in Figure 5 and discussed above: the switches MSY1–MSY3 of Figures 6 and 8 may also be of the type shown in Figure 5.

Referring to Figure 6, a plurality of parallel-operated memory matrices, exemplified by blocks MM1–MM3, are provided with a single X-switch SMX, each of whose cores is provided with an output coil which is also a column coil in all the memory matrices. Alternatively separate X switches may be used for each matrix driven by one common set of X driving tubes. For each of the memory matrices, there is provided an individual Y-switch: specifically, each of the cores of switch MSY1 is provided with an output coil which is also a row coil for a different row of cores in the associated memory matrix MM1 and similarly each of the cores of the switches MSY2, MSY3 provides for energization of a corresponding row coil of the associated memory matrices MM2, MM3, respectively.

The common driver VR of the Y-switches MSY1–MSY3 and the driver VC of the X-switch SMX are both controlled by the master pulse as applied through output lines 21, 21 of the master pulse former 19. Each of the Y-switches MSY1–MSY3 has common to all of its cores a pulsed winding in addition to or common with its D. C. bias winding (Figures 7A–7C). For clarity of explanation, it will be assumed that as in Figure 7A (and Figure 6), the pulsed winding 13P is distinct from the bias winding 13D although it may be the same winding 13, as in Figures 7B, 7C. Each core of each Y-switch is arranged to operate upon the occurrence of a triple coincidence which arises when the corresponding address or information lines are set up and the common pulsed winding is operated.

For clarity of explanation, and, referring to Figure 6 which shows only the cores operated when a particular bit of information is to be supplied to or restored in the parallel memory matrices, the driver tubes in VC have been addressed for selection of core 10X of switch SMX and the driver tubes in VR have been addressed for selection of cores 10Y1, 10Y2 and 10Y3 of switches MSY1–MSY3. When the driver tubes in VC are gated by the master pulse, the selected switch core 10X is driven to point P (Figure 2) to produce a first output pulse energizing the common column coil C of all memory matrices. This column coil includes the X windings of the memory matrix cores 10M1, 10M2, 10M3. When the driver tubes in VR are gated by the master pulse, the pairs of input coils respectively including coils 11 and coils 12 of cores 10Y1, 10Y2 and 10Y3 are energized. The master pulse is applied through line 31Y and "and" gate 3 which passes a pulse except in the presence of an inhibiting pulse from either "and" gate 1 or "and" gate 2 to the control grids of tubes 30Y1–30Y3. These tubes energize the common core winding 13P of each Y switch and therefore triple coincidence occurs at cores 10Y1, 10Y2, 10Y3. The gate is of the type which has a normal input and an inhibiting input. The normal input is passed thru the gate except in the presence of the inhibiting input. Accordingly, the switch cores 10Y1, 10Y2, and 10Y3 of the Y switches MSY1–MSY3 each shift to point P of their hysteresis characteristic. The resulting change of flux in each of these cores induces current in its output winding to effect energization of the corresponding row coil R1, R2, R3 of the associated memory matrix MM1, MM2, MM3. As this pulse excitation of the individual row windings R1–R3 is coincident with pulse excitation of the common column winding C, each of the cores 10M1, 10M2, 10M3 of the memory matrices is switched from the N-state to the P-state by the master pulse at or near the beginning of the program cycle.

If it is desired to write P in a particular memory matrix, the energization of the common core winding 13P of the corresponding Y-switch is materially reduced or cut off early in the program cycle by an inhibiting pulse which commences at the end of the pulse generated by the "write P" pulse 24. Thus, the second output pulse of that Y-switch core is not coincident with the second output pulse of switch core 10X and consequently the core of the memory matrix associated with that Y-switch is left in the P-state.

More particularly, if it is desired to write P in the core 10M2 of matrix MM2, an inhibiting pulse output of the "and" gate 1 or "and" gate 2 closes gate 25Y2, thus shortening the master pulse as applied to the common core winding B of switch MSY2. Thus, the core 10Y2 is shifted back to N1 or N2 of its characteristic well before the core 10X is returned to its N-state, upon termination of the master pulse, by the common D. C. winding B of switch SMX. Because of the non-coincidence of the second output pulses of cores 10Y2 and 10X, the core 10M2 is left in the P-state to which it was driven near the beginning of the program cycle by coincidence of the output pulses of cores 10X, 10Y2.

Assuming it is desired to write N in the cores 10M1, 10M3, the gates 25Y1, 25Y3 are so controlled during the program cycle so that the shortened control pulse is not effectively applied to switches MSY1 and MSY3. Consequently upon termination of the master pulse, the output pulses of each of switch cores 10Y1 and 10Y3 are each coincident with the output pulse of switch core 10X and the cores 10M1, 10M3 of the memory matrices MM1, MM3 are consequently driven back to N-saturation.

In the particular arrangement shown in Figure 6, as previously indicated, the No. 3 "and" gates for the individual Y-switch channels are of the type which remain open for transmission of the whole master pulse unless closed by a "write-P" pulse resulting either from an instruction to write-P or from a write-P instruction from the reading amplifier, if, upon an instruction to read that amplifier, the selected core of the corresponding memory matrix is in the P-state.

The No. 1 "and" gates and the No. 2 "and" gates are also of a similar type. The write-P pulse former produces a pulse which commences at the same time as the master pulse but has one half the duration. This pulse inhibits the "and" No. 1 and the No. 2 gates. These gates when operated inhibit "and" No. 3 gate. Therefore during the first half of the pulse from the write-P pulse former all "and" No. 3 gates are always open. Thus the first half of the master pulse is always fed to all switches. If an instruction to write-P has been given on a particular line, "and" gate No. 2 will operate when the pulse from the write-P pulse former has finished. This in turn will inhibit "and" gate No. 3 and hence shorten the pulse applied to the winding 13P.

If the instruction to read has been given then "and" gate 1 is primed by the instruction to read line. This gate cannot operate during the existence of the pulse from the "write-P pulse former" but can operate after it terminates if a suitable signal is transmitted from the reading circuit 27 to "and" gate 1. This circuit is so arranged that if the information read out from the matrix indicates a P-state then the signal from the circuit will be such as to maintain a level which will prime "and" No. 1. Hence if P-state is detected in the matrix then "and" No. 1 is operated which inhibits "and" No. 3 which shortens the pulse in coil 13P and hence the matrix core is left in the P-stage. The reading circuit 27 can for example consist of a suitable amplifier coupled to the output of the reading coil of a magnetic memory matrix. The amplifier drives a monostable multivibrator of the type previously referred to herein. The output of the multivibrator is used to prime "and" gate 1. A suitable reading circuit of this general type may be found described in an application by L. B. Person, filed March 28, 1952, Serial No. 279,113, entitled Magnetic Memory Matrix Writing System and assigned to this assignee.

In summary a pulse from the master pulse former is applied to the X and Y switch driver tubes and through "and" gate 3 to the winding 13P. The "and" gate 3 remains open as long as no inhibit pulse is received from either "and" gate 1 or "and" gate 2. "And" gate 1 has two normal inputs and one inhibit input. "And" gate 2 has one normal input and one inhibit input. The inhibit inputs to "and" gates 1 and 2 are provided by the output of the P pulse which generates a pulse simultaneously with the master pulse former but half its duration. The "and" gate 1 requires an input from both the reading circuit and an instruction to read line to provide an output. "And" gate 2 provides an output from the instruction to write P line.

Reverting to early restoration of a switch core for a "write-P" operation, the restoring action may be delayed more than in some other magnetic types of commutators due both to the smaller magnitude of the restoring force and to distortion of the restoring pulse by inductive lag in the inhibiting winding. Such delay, however, is of no consequence as the restoring pulse is not utilized for resetting. The resetting of this system occurs when all switching cores are returned to their N point by the biasing windings at termination of the master pulse. If in a particular system, it is found the restore delay is excessive, the circuit may be modified as by inclusion of a delay line in the input to the master pulse former, or in its output circuit, so that the biasing pulse for switch MSY1–MSY3 is applied in advance of gating of the drivers.

In the system of Figure 6, the control pulse input from pulse former 24 may be arranged to control the restoration of the cores of switches MSY1–MSY3 in another manner. In this case, the currents in the Y-switch drives are increased so that a double coincidence of pulses in a row and a column coil is required to shift one core of each switch MSY1–MSY3 from the N state. The B coil or bias coil of any switch MSY1–MSY3 is energized by a pulse which provides a magnetomotive force in a direction N only if it is desired to leave the information core of the associated memory matrix in a P-state. This occurs because the pulsed B coil has the effect of driving the selected switch core in the Y-switching matrix to N before the X-switching matrix core is so restored. This may be accomplished by changing "and" gate 3 from the type of gate that provides an output when one input is applied thereto and is inhibited by a second input to the type of gate which provides an output only when two inputs are applied thereto. This variant has the advantages that any delays in the common restoring windings B of the switches MSY1–MSY3 are very unimportant and that the driving tubes are in use for a shorter period of time. Further in this modification, the D. C. biasing coils of the cores may also serve as the N restore winding by injection of additional current during the N restore operation. Such injection may be accomplished by a direct tube drive as in Figure 7B or by a pulse transformer 33 as in Figure 7C. In the latter case, it is permissible to allow the transformer 33 to swing positive for D. C. restoration purposes provided that the output pulse of the transformer 33 terminates after the master pulse.

The modification shown in Figure 8 is similar to that shown in Figure 6 except that the address for the Y-switches is divided, certain of the address inputs being supplied to all of the Y-switches and other of them being supplied to the individual Y-switches of the several memory matrices. Specifically, the driver group VR controls the column windings of all of the Y-switches MSY1–MSY3 and the driver groups VRR1–VRR3 respectively control the row windings of switches MSY1–MSY3. The master pulse from the program control network MC gates the driver group VC for the X-switch SMX and also gates the driver group VRC, common to the Y-switches MSY1–MSY3. The remainder of the driver groups VRR1–VRR3 set the same address in each of the Y-switches MSY1–MSY3. The operation of the driver groups VRR1–VRR3 may be individually terminated earlier in the program cycle under control of the "write-P" pulse former 24 and the individual gates 25Y1–25Y3. Consequently, these driver groups combine in each of the Y-switches together with the action of the address drives and the common core winding B to provide a very flexible control mechanism. This type of parallel operation is useful when the storage capacity of the memory matrices is small. The arrangement of Figure 8 is also useful when it is desired to store either in parallel or in serial manner. With an expanded arrangement similar to Figure 8, it is possible to operate upon a 10,000 bit serial store either in serial manner by addressing only one Y-switch with an address to the X-switch or as ten 1,000 bit parallel stores, i. e., as a 1,000 "word" memory, each word containing 10 bits. Such flexibility is of advantage in certain types of information-handling systems, as it affords serial-parallel conversion, or vice versa.

An arrangement of circuits which may be used for a set of "and" gates 1, 2 and 3 used with a switch in Figure 6 and Figure 8 is shown in Figure 9. "And" gate 1 consists of three tubes 100, 110, and 120 each having its anode connected to a common anode load 102, and its cathode connected to ground. The grid 104 of the first tube 100 is coupled to the write P pulse former 24 and to a negative bias source so that, in the absence of a pulse, the tube 100 is normally non-conducting. The grid 114 of the second tube 110 is coupled to the instruction to read line and to ground through a grid leak resistor so that, in the absence of a pulse, the tube 114 is normally conducting. The grid 124 of the third tube 120 is coupled to the reading circuit 27 and to ground through a grid leak resistor so that, in the absence of a pulse, the tube is normally conducting. Therefore, the voltage at the junction 106 of the anodes of the three tubes is low and remains low until all three tubes are not conducting. This happens only in the absence of a pulse from the write P pulse former 24 and in the presence of pulses from the instruction to read line and from the reading circuit 27.

"And" gate 2 consists of two tubes 130, 140 having a common anode load 132 and their cathodes connected to ground. The grid 134 of the first tube 130 is coupled to the write P pulse former 24 and to a source of negative bias so that, in the absence of a pulse, the tube 130 is normally non-conducting. The grid 144 of the second tube 140 is coupled to the instruction to the write P line and to ground through a grid leak resistor so that, in the absence of a pulse, the tube 140 is normally conducting. Therefore, the voltage at the junction 136 of the anodes of the tubes is low and remains low until both the tubes cease conduction. This happens in the absence of a pulse from the write P pulse former 24 and in the presence of a pulse from the instruction to write P line.

A first diode 150 has its anode connected to the anode junction 106 of "and" gate 1 and a second diode 152 has its anode connected to the anode junction 136 of "and" gate 2. The cathodes of the diodes are connected together and, through a voltage divider resistor 154, to a negative bias source. When the anode junctions 106, 136 of "and" gate 1 as well as "and" gate 2 are both low, the diodes 150, 152 conduct in a limited manner. When either anode junction goes high, responsive to all the tubes in the particular "and" gate being cut off, the diode connected to the high point becomes more conductive. An inverter tube 160 has its grid 162 coupled to a point H on the voltage divider 154. When both diodes 150, 152 are in the state of limited conduction the voltage applied to the inverter tube grid 162 from point H is negative. Therefore, point H', which is on a voltage divider 164 in which the inverter tube has its anode load 166 connected is at a high potential. When either one of the diodes becomes more conductive point H goes to a more positive potential, the inverter tube conducts and point H' goes to a more negative potential.

"And" gate 3 consists of two tubes 170, 180, the first 170 being a multigrid tube having its control grid 172 coupled to point H'. The suppressor grid 174 of the tube is connected to line 31Y. The cathode is connected to ground and the anode is connected to B+ through a plate load resistor 176. Therefore, the tube 170 is in condition to conduct whenever it receives a pulse from line 31Y, but only as long as point H' is high, which condition prevails as long as either "and" gate 1 or "and" gate 2 remains closed. As soon as point H goes positive, point H' goes negative and holds the tube 170 non-conductive in spite of any signals applied through line 31Y to the suppressor grid.

The second inverter tube 180 has its control grid 182 connected to a voltage divider 178 in which the anode load 176 of the tube 170 is connected. This second tube 180 is accordingly rendered conducting when a first tube 170 is cut-off and is cut off when the tube 170 is conducting. The anode of this second inverter 180 has its load resistor 186 connected into a voltage divider 188 from a lower point of which connection is made to the grid of tube $30Y_1$. It is to be understood that there is one set of this "and" gate circuitry for each memory. The next set of "and" gates is connected to $30Y_2$. The third set is connected to $30Y_3$ and so forth.

For performing the alternative type of operation described under Figure 6 where the auxiliary coil winding is used to oppose the drive from VR and thus restore the Y switches before the X switch thus leaving the memory core in P, the circuitry shown in Figure 9 may be readily used. The inverter tube 160 is omitted as well as divider 164 and points H and H' are connected together. Thus "and" gate 3 will only provide an output when either "and" gate 1 or "and" gate 2 is opened (point 106 or 136 made high) and a pulse is applied from the master pulse former 19.

It is thus seen that the arrangement of gates comprises apparatus for the selective termination of the operation of the drives applied to the magnetic switches by the drivers VC and VR or VRR1 and VRC. These drivers may be termed selective driving and holding means for the cores in the magnetic switches since they serve the purpose of selectively driving and holding the cores in the magnetic switches at a P polarity of magnetization. The auxiliary coil having windings 13P may be included since although not selective in its action it is still ineffective without the aid of the drivers.

For clarity and simplicity of illustration of the systems of Figures 6 and 8, the memory and switching matrices have been represented by blocks. However, it will be understood that the memory matrices each comprise a multiplicity of cores with windings arranged in a manner, as more fully disclosed in copending application filed September 30, 1950, for "Magnetic Matrix Memory" by J. A. Rajchman, bearing Serial Number 187,733, and assigned to this assignee, or in an article in the "Preview of Scientific Instruments," September 1951, by Jay Forrester, and that the switching matrices comprise a plurality of cores with coils having the inductive relations shown in Figure 1 or Figures 7A–7C with the switching coils connected to form row and column windings and with the D. C. coils (and also the pulsed N-restore coils, when physically distinct from the D. C. coils) common to all cores. During a switching operation, the $x$ address pulse or the $y$ address pulse may be applied to more than one core of the switch, but both pulses are simultaneously applied to only one core and consequently only that core, as above explained, is driven from N1 to P (Figure 2), the others, if excited at all, remaining in the region of N-saturation because of the D. C. bias.

Also for simplicity of explanation and illustration, the memory storage unit of Figures 6 and 8 is for three-digit words, but obviously such unit may be expanded for longer words by correspondingly increasing the number of memory matrices. In such expanded unit, all of the memory matrices and under control of the network MC by circuitry similar to that shown for matrices MM1–MM3 of these figures.

In general, the operation of the switches from paired pulses simplifies and reduces the required control equipment. As one master pulse controls the timing of all critical operations, the problem of proper timing is greatly simplified and there is a minimum waste of time as it is not necessary to insert delay elements to allow for the turnover time of flip-flop circuits such as used in other program control systems. The master pulse also provides an overall amplitude control of the driver current and shaping of it compensates for non-linearity of the amplifiers. A most significant advantage of the invention is that it allows use of direct current inhibiting windings in the switches with the consequent advantages that:

(1) It is not necessary to swing the switch core over its entire magnetization characteristic, and hence more efficient current-transformer action is obtained;

(2) The magnetic states of the core are maintained by currents, and hence highly efficient core material having non-rectangular hysteresis loops may be used;

(3) Transients, due to decay of current in the switch, are merged in the N-restore action, and, consequently, such transients cannot be a source of misinformation; and (4) Rapid operation is obtainable even with switch cores having short pulse windings and long D. C. windings.

What is claimed is:

1. A magnetic matrix arrangement comprising a plurality of magnetic cores each having a pair of switching windings, a biasing winding and an output winding, means for supplying direct current to said biasing windings to saturate all of said cores, means for initiating a pair of current pulses, means for respectively applying said pair of pulses to the pair of switching windings of a selected core of said plurality to effect a flux change despite energization of said biasing winding and so induce an output pulse of one polarity in said output winding upon initiation of coincidence of said pulses, and means for selectively terminating said pair of current pulses either at the same or different times, said biasing winding returning the selected core substantially to its original saturation upon a coincidence in the termination of said pair of pulses.

2. A switching arrangement for a magnetic memory matrix of the type including a plurality of magnetic cores and two sets of selecting coils, and wherein the addressing of a core in said memory requires coincident excitation of one coil in each set which is coupled to said core, said switching arrangement comprising a first and a second magnetic switch each comprising a plurality of magnetic cores, each core having a biasing winding, means for supplying direct current to said biasing winding of each core to saturate all of said switch cores at one magnetic polarity, each of the cores of said first magnetic switch being inductively coupled to a different one of said first set of coils, each of the cores of said second magnetic switch being inductively coupled to a different one of said second set of coils, means to initiate a master pulse, a means for each of said switches to selectively drive and hold a desired one of the cores in each switch toward saturation at the opposite magnetic polarity responsive to the application of said master pulse, whereby a core in said magnetic memory matrix which is inductively coupled to said two selected switch cores receives a magnetomotive drive to one magnetic saturation polarity, means to initiate a signal when it is desired to leave said memory matrix core in said one magnetic saturation polarity, and means responsive to said signal to render inoperative the hold of each said means to selectively drive and hold a desired one of the cores at different times.

3. A switching arrangement as recited in claim 2 wherein said means to render inoperative the hold of each of said means to selectively drive and hold a desired one of the cores at different times includes means to generate a pulse simultaneously with and of longer duration than said master pulse, a closed gate, means to apply said longer duration pulse to the input of said closed gate, means to apply said signal to said gate to open said gate, and means to apply the output from said gate to said means to selectively drive and hold a desired one of the cores of said second switch to thereby maintain it operative beyond the duration of said master pulse.

4. A switching arrangement as recited in claim 2 wherein said means to render inoperative the hold of each said means to selectively drive and hold a desired one of the cores at different times includes means to generate a pulse at least equal to and during the latter half of said master pulse, a closed gate means to apply said half pulse to the input of said closed gate, means to apply said signal to said gate to open said gate, and means to apply the output of said gate in opposition to said master pulse to said means to selectively drive and hold a desired one of the cores in said second switch.

5. A switching system as recited in claim 2 wherein said means for each of said switches to selectively drive and hold a desired one of the cores in each switch toward saturation at the opposite magnetic polarity responsive to the application of said master pulse each includes two switching windings on each core, and means to selectively apply current to the two switching windings on a desired core responsive to the application of said master pulse; and said means responsive to said signal to render inoperative the hold of each of said means to selectively drive and hold a desired one of the cores at different times includes an open gating means, means to apply said master pulse through said gating means to one of said means to selectively drive and hold a desired one of said cores, and means to close said gating means responsive to said signal to prevent further transmission of said master pulse therethrough.

6. A switching system as recited in claim 2 wherein said means responsive to a signal to nullify the hold of one of said means to selectively drive and hold a desired one of the cores before the termination of operation of the other includes a closed gating means, means to apply said master pulse to said closed gating means, means coupling the output of said gating means to said biasing windings of the cores of said first switch, means to apply said signal to said gating means to render it open to thereby apply said master pulse to said biasing windings in a direction to nullify the hold of one of said means to selectively drive and hold a desired one of said cores toward saturation at the opposite magnetic polarity.

7. A magnetic switching system as recited in claim 2 wherein the one of said means to selectively drive and hold a desired one of the cores in said second magnetic switch towards saturation at the opposite magnetic polarity responsive to the application of said master pulse includes two switching windings on each core, means to apply current to the two switching windings on a desired core responsive to the application of said master pulse, a coil including windings on all the cores of said second switch, and means to apply said master pulse to said coil whereupon said desired core is driven by said triple excitation coincidence towards saturation at the opposite magnetic polarity; and said means to nullify the hold of said means to selectively drive and hold a desired one of said second switch cores before termination of the hold on said desired one of said first switch cores includes an open gating means, means to apply said master pulse to said coil through said gating means, and means to close said gating means responsive to said signal to prevent further transmission of said master pulse therethrough.

8. A magnetic switching arrangement for a magnetic memory matrix of the type including a plurality of magnetic cores and two sets of selecting coils, addressing any core in said memory requiring coincident excitation of one coil in each set which is coupled to said core, said switching arrangement comprising a first and a second magnetic switch each comprising a plurality of magnetic cores, each core having a pair of switching windings and a biasing winding, means for supplying direct current to said biasing windings to saturate all of said cores, each of the cores of said first magnetic switch being respectively coupled to a different one of said first set of coils, each of the cores of said second magnetic switch being respectively coupled to a different one of said second set of coils, means for initiating two pairs of current pulses, means for initiating a master pulse, means responsive to said master pulse for applying one pair of said current pulses to the pair of switching windings of a desired core in said first magnetic switch, means responsive to said master pulse for applying the other pair of said current pulses to the pair of switching windings of a desired core in said second magnetic switch, both said pairs of current pulses effectuating flux changes in said desired cores despite energization of said biasing windings and so simultaneously inducing currents in a coil in each set of selecting coils to drive to one magnetic saturation the core in said magnetic memory matrix coupled to said selecting coils, and means to terminate said two pairs of current pulses simultaneously to drive said magnetic memory matrix core to the other magnetic saturation and to terminate said pairs of current pulses at different intervals to leave said magnetic memory matrix core at said one magnetic saturation.

9. A magnetic switching arrangement for a plurality of parallel-operated magnetic memory matrices comprising an X switch common to said memory matrices, a driver for said X switch set in accordance with the X address of information for said memory matrices, a plurality of Y switches, one for each of said memory matrices, a common driver for said Y switches set in accordance with the Y address of information for said memory matrices, each of said Y switches comprising magnetic cores having windings selectively energized from the common Y driver and having a common D. C. winding, a program control network including a master pulse former and a second pulse former, circuitry for applying the output of said master pulse former to gate both of said drivers, a plurality of gates each effectively interposed between one of said Y switches and said second pulse former, and means individually to control said gates selectively to effect in each memory matrix either coincidence or non-coincidence of termination of pulses respectively from the common X switch and from the Y switch individual to that matrix.

10. An arrangement as in claim 9 in which each of the gates is in circuit between said second pulse former and a common winding of the cores of the corresponding Y switch.

11. An arrangement as in claim 10 in which the common winding energizable from the second pulse former also serves as the D. C. winding.

12. An arrangement as in claim 10 in which the common winding energizable from the second pulse former is in addition to the common D. C. winding for the cores.

13. An arrangement as in claim 10 in which the pulse from the second pulse former to the common winding is an inhibiting pulse coincident with but shorter than the master pulse.

14. An arrangement as in claim 10 in which the common driver for the Y switches is set by all of Y address information and in which each of the gates is interposed between the second pulse former and a common winding of the cores of the associated Y switch to permit or to preclude passage of an inhibiting pulse.

15. An arrangement as in claim 10 in which the common driver for the Y switches is set by some of the Y address information, which additionally includes drivers, one for each of the Y switches, set by the remainder of the Y address information, and in which each of the gates is interposed between the second pulse former and and a common winding of the cores of the associated Y switch to permit or to preclude passage of a driving pulse.

16. A system including a magnetic memory matrix and two magnetic switching matrices characterized in that each of said switching matrices includes a plurality of magnetic cores each having a pair of switching windings, a biasing winding and an output winding; means for supplying direct current to the biasing windings of all cores of both switching matrices normally to saturate them, means for initiating a switching pulse simultaneously applied to the switching windings of a selected core of each of said switching matrices and for concurrently initiating a second switching pulse, the concurrent energization of both switching windings of each selected core producing an output pulse despite the biasing winding, the two output pulses of the selected cores of the switches effecting reversal of the direction of saturation of a selected core of the memory matrix, and means for applying said second switching pulse to, or withholding it from, one of said selected cores whereby the output pulses of the selected switching cores are either coincident to return the selected core of the memory matrix to its original direction of saturation or non-coincident to leave it in its reversed direction of saturation.

17. A magnetic switching arrangement for a plurality of parallel-operated magnetic-memory matrices comprising an X magnetic switch common to all of said matrices and a plurality of Y magnetic switches, one for each of said matrices, all of said magnetic switches each comprising a plurality of magnetic cores each having at least a pair of pulse windings, a biasing winding and an output winding, the biasing windings of the cores of each switch being connected to form a biasing coil for the switch, gated drive means for said common magnetic switch, gated drive means for said plurality of magnetic switches, and a program control network comprising two pulse formers connected to a "to write or read" instruction line, connections for applying the output of one of said pulse formers to both of said gated drive means, and connections for applying the output of the other of said pulse formers respectively to modify the effect of the biasing coil of each of said plurality of Y switches, each of said last-named connections including a gating device selectively permitting or precluding transmission in accordance with "write N" or "write P" information for the corresponding Y switch.

18. For a system comprising a magnetic memory matrix, a read-out circuit therefor, and switching matrices respectively for different sides of said memory matrix, a program control network having the characteristic that information to be stored in the memory matrix is available for read-out during the write-in period of the program cycle comprising a master pulse former and a second pulse former, both simultaneously responsive to an instruction to write or read, circuitry for applying the output of said master pulse former to both of said switching matrices to turn over a selected core of said memory matrix, said circuitry including a gate in the pulse path to one of said switches, and circuitry including a second gate for control of said first gate selectively to effect either coincidence or non-coincidence of return of said switching matrices to their original state so to leave said memory core turned over or to return it to its original state, said second gate having applied thereto the output of said second pulse former, the output of said read-out circuit which is of zero or finite value depending upon the state of said selected core, and an instruction to read.

19. For a system comprising a magnetic memory matrix, and switching matrices respectively for different sides of said memory matrix, a program control network comprising a master pulse former and a second pulse former, both simultaneously responsive to an instruction to write or read, circuitry for applying the output of said master pulse former to both of said switching matrices to turn over a selected core of said memory matrix, said circuitry including a gate in the pulse path to one of said switches, and circuitry including a second gate for control of said first gate selectively to effect either coincidence or non-coincidence of return of said switching matrices to their original state so as to leave said memory core turned over or to return it to its original state, said second gate having applied thereto the output of said second pulse former, and an instruction to write.

No references cited.